(12) United States Patent
Gottschalk et al.

(10) Patent No.: US 11,804,713 B2
(45) Date of Patent: Oct. 31, 2023

(54) CONTROLLING AN ENERGY SYSTEM USING AN ITERATION PROCESS FOR SELECTED BUSES OF THE ENERGY SYSTEM

(71) Applicant: Siemens Aktiengesellschaft, Munich (DE)

(72) Inventors: Corinna Gottschalk, Munich (DE); Martin Seydenschwanz, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 330 days.

(21) Appl. No.: 17/155,368

(22) Filed: Jan. 22, 2021

(65) Prior Publication Data
US 2021/0234373 A1 Jul. 29, 2021

(30) Foreign Application Priority Data
Jan. 29, 2020 (EP) ..................................... 20154370

(51) Int. Cl.
*H02J 3/38* (2006.01)
*G05B 13/04* (2006.01)
*H02J 3/14* (2006.01)

(52) U.S. Cl.
CPC ............ *H02J 3/144* (2020.01); *G05B 13/042* (2013.01); *H02J 3/381* (2013.01); *H02J 2203/20* (2020.01); *H02J 2300/22* (2020.01)

(58) Field of Classification Search
CPC ........ H02J 3/144; H02J 3/381; H02J 2203/20; H02J 2300/22; G05B 13/042; Y02B 70/3225; Y04S 20/222
See application file for complete search history.

(56) References Cited

U.S. PATENT DOCUMENTS

| | | | |
|---|---|---|---|
| 8,239,070 B1 | 8/2012 | Schlueter et al. | |
| 8,326,594 B2 * | 12/2012 | Sun ........................... | H02J 3/00 703/2 |
| 8,756,047 B2 * | 6/2014 | Patel ......................... | H02J 3/06 706/16 |
| 2004/0243376 A1 * | 12/2004 | Karunaratne ........... | G06F 30/33 703/18 |

(Continued)

FOREIGN PATENT DOCUMENTS

WO    WO 2013152188 A1    10/2013

*Primary Examiner* — M. N. Von Buhr
(74) *Attorney, Agent, or Firm* — Schmeiser, Olsen & Watts LLP

(57) ABSTRACT

An energy system that has components connected by buses, and a method and an apparatus for controlling same is provided. The components are labelled as either non-fixed or fixed, depending on whether their energy operating point is specified. The control of the energy system includes performing an iteration process via all of the buses. A respective iteration for the respectively selected bus includes attempting to balance a power budget of the selected bus by specifying the energy operating points of components connected to the respective bus that are labelled as non-fixed. If the balancing for the respective bus is successful, all of the components connected to the respective bus are labelled as fixed; otherwise, the label of components connected to the respective bus is converted from fixed to non-fixed and a fresh iteration for the bus is triggered.

15 Claims, 5 Drawing Sheets

(56) References Cited

U.S. PATENT DOCUMENTS

| | | | |
|---|---|---|---|
| 2006/0153309 A1* | 7/2006 | Tang | H04L 5/0044 375/260 |
| 2015/0193692 A1* | 7/2015 | Israel | G06N 10/00 706/52 |
| 2017/0214242 A1* | 7/2017 | Chopade | H02J 3/00 |

* cited by examiner

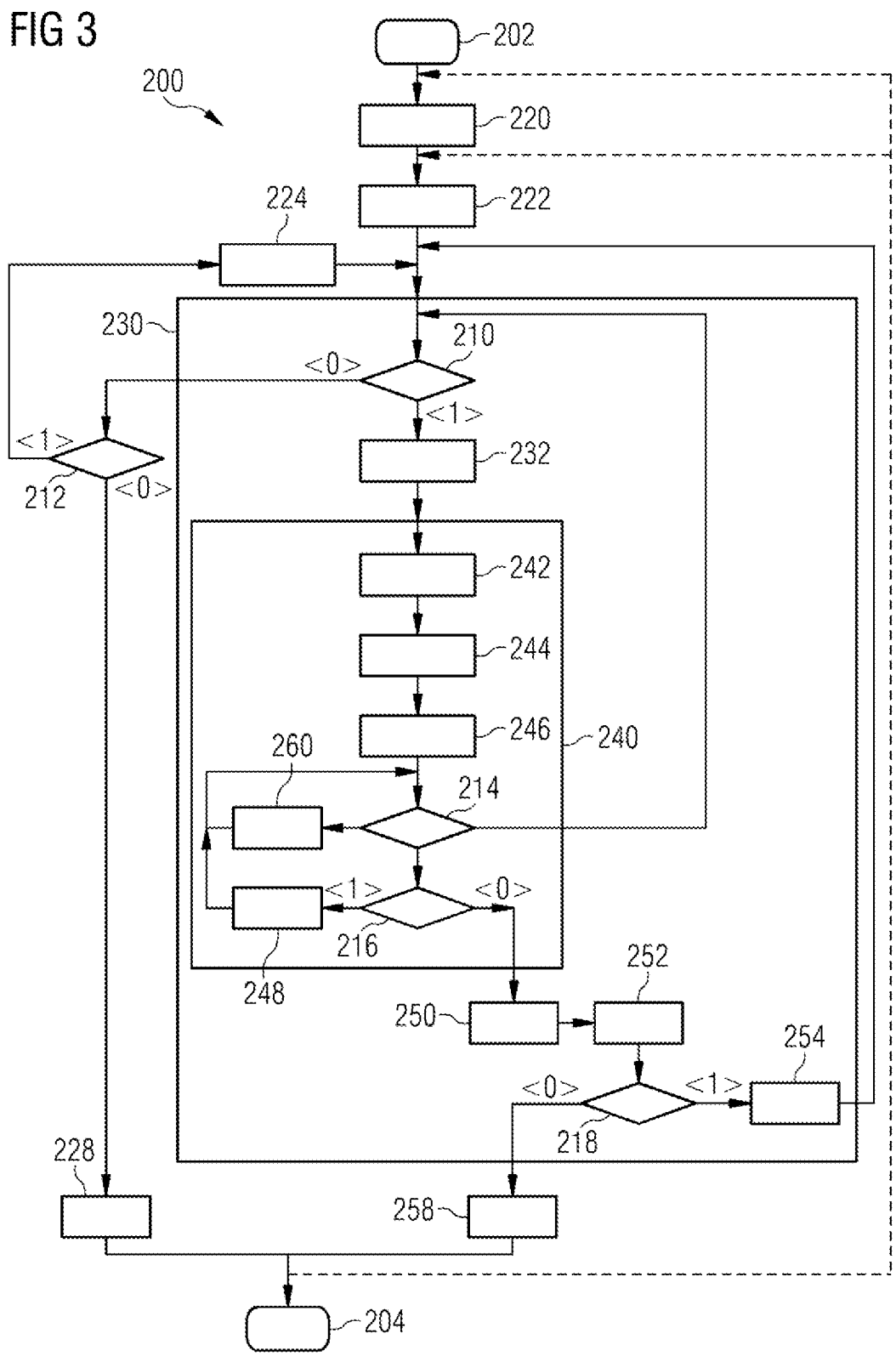

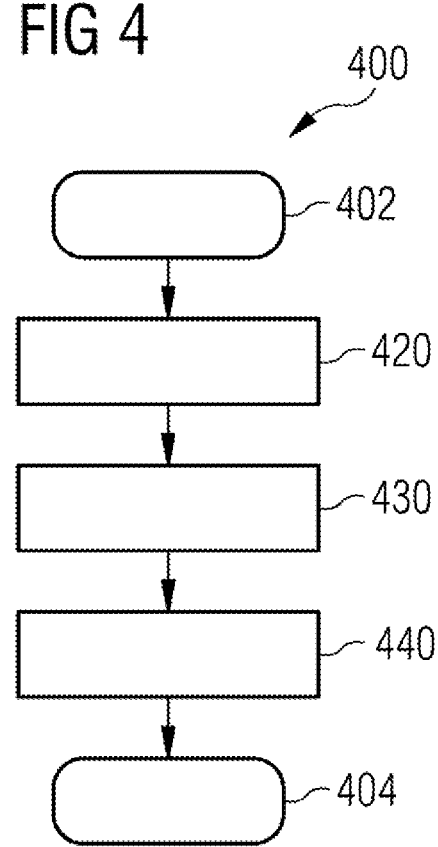

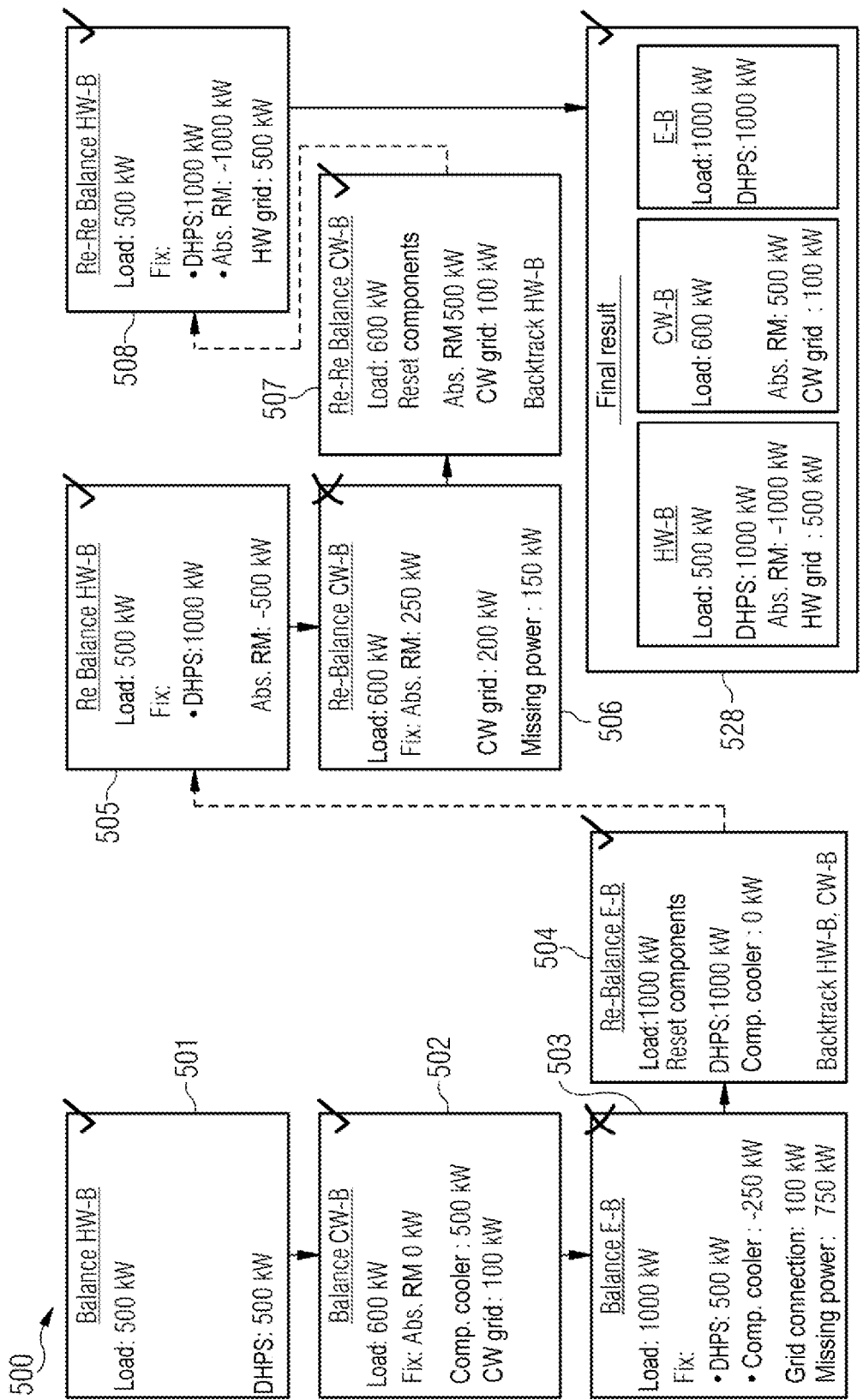

CONTROLLING AN ENERGY SYSTEM USING AN ITERATION PROCESS FOR SELECTED BUSES OF THE ENERGY SYSTEM

CROSS-REFERENCE TO RELATED APPLICATIONS

This application claims priority to European Application No. 20154370.9, having a filing date of Jan. 29, 2020, the entire contents of which are hereby incorporated by reference.

FIELD OF TECHNOLOGY

The following lies in the field of power engineering and relates in particular to a method for controlling an energy system, a computer program logic unit for carrying out the method and an apparatus for controlling an energy system.

BACKGROUND

In an energy system having multiple buses and components, a load distribution between the buses and components, such as for example between generators and consumers connected via one of the buses, is normally controlled in such a way that the power budget is balanced. As such it is possible for example to accomplish decentralized power generation in microgrids—for example for independent power supply for buildings, industrial plants or islands—by a combination of conventional generators and regenerative energy sources, a respective amount of power to be provided by one of the conventional or regenerative generators being able to be controlled to balance the consumers.

To control a load distribution in an energy system, for example an energy grid, various mixed-integer (non-)linear models are normally used. However, solving such load distribution problems and consequently mixed-integer (non-)linear optimization problems can lead to a high level of computation effort and hence to high demands on an applicable control apparatus and to delays or non-robust behavior for the control.

Complexity and/or computation effort could also be increased—when regarding control by solving mixed-integer (non-)linear load distribution problems—for the design and possible simulation of such an energy system, as a result of which for example the simulation would need to be simplified, the simulation could require much time or processing power, or only a reduced number of possible variations can be simulated, that is to say for example inaccuracies arise or a possibly better suitability of other, unsimulated variants might not be examined and therefore not be considered for the design. On the other hand, simplified models for taking into consideration the load distribution during design can result in inaccuracies or in no solutions being able to be found for load distributions for specific energy systems.

SUMMARY

An aspect relates to methods and apparatuses for controlling an energy system and also an energy system that is controlled by such a method or such an apparatus and a method when simulating energy systems and in so doing in particular to reduce a computation effort for the control, to make a behavior of such control more robust and/or to allow control within a predetermined period of time.

Various techniques described herein meet this need in each case by a computer-implemented method for controlling an energy system having multiple components, by a computer program logic unit for carrying out such a method and by an apparatus for controlling an energy system having multiple components.

A first aspect of embodiments of the invention relate to a computer-implemented method for controlling an energy system. The energy system in this case has multiple components connected to one another by a multiplicity of buses of the energy system for energy transmission purposes, the components comprising generators and consumers. The components are labelled as either non-fixed or fixed, depending on whether their energy operating point is specified. The method comprises performing an iteration process via all of the buses of the multiplicity of buses. A respective iteration for the respectively selected bus respectively comprises attempting to balance a power budget of the selected bus by specifying the energy operating points of components connected to the respective bus that are labelled as non-fixed. Additionally, the respective iteration comprises labelling all of the components connected to the respective bus as fixed if the balancing for the respective bus is successful. Additionally, the respective iteration comprises converting the label of at least one component connected to the respective bus from fixed to non-fixed if the balancing for the respective bus is not successful, and triggering a fresh iteration for the respective bus.

This means that a fresh attempt at balancing the power budget is rendered possible in the fresh iteration, with components that were possibly previously labelled as fixed now being labelled as non-fixed and hence possible degrees of freedom for the balancing being increased, as a result of which successful balancing can be made possible. Such techniques may also be able to be used to specify, on each bus, the energy operating points of the components connected thereto and at the same time to limit a number of iterations on the basis of a number of the multiplicity of buses and to limit the number of any fresh iterations that are required. In general, a computation effort for controlling the energy system can be reduced, allowing control even for runtime-critical energy systems and/or allowing control or optimization in real time. One advantage may also be in particular that the behavior of such a rule-based method or of an applicable apparatus for controlling the energy system can be understood more easily during the design of the apparatus and the physical operation of the apparatus, which allows a more robust design and allows any errors in the control to be detected and/or rectified more easily. Such a technique can also allow rule-based control of a load distribution between the components via the buses. This firstly allows—in particular in comparison with solutions that are based on mixed-integer (non-)linear optimization problems—a computation effort and corresponding demands on an applicable computer program logic unit or control apparatus to be reduced. Moreover, the robustness of the control can be increased. Secondly—for example in comparison with simple rule-based controls that comprise no fresh and/or freshly repeated iterations, for example—it is possible for control of an arbitrarily complex topology of the buses and components and the coupling thereof—for example even for different energy forms, a large number of buses, for example more than two or five, or for multiple buses having similar, in particular high, bus priorities—to be made possible.

In some embodiments the method additionally comprises triggering a fresh iteration via one or more buses that are connected to the selected bus via a component whose label is converted from fixed to non-fixed if the balancing for a selected bus is not successful. In some variants thereof the fresh iteration via the selected bus is carried out first and then possibly a fresh iteration via the one or more buses that are connected to the selected bus via a component whose label is converted from fixed to non-fixed. In this advantageous manner it is first possible to balance the selected bus—that is to say for example to make an attempt at balancing the power budget of the selected bus without buses connected to the selected bus or components accordingly labelled as fixed that are connected to both buses being taken into consideration, as a result of which in particular the degrees of freedom for balancing the power budget increase and hence for example successful balancing becomes more likely. It is also possible, in this advantageous manner, for the one or more buses connected to the selected bus via a component whose label is converted from fixed to non-fixed to be balanced in a manner corresponding to successful balancing of the selected bus and possibly while regarding the balanced selected bus and the components accordingly labelled as fixed.

In some embodiments the method additionally comprises allocating bus priorities to the buses and performing an iteration process via all of the buses in an order in accordance with the bus priorities.

In this advantageous manner it is possible to predetermine an order in which the iteration process is performed. As such, for example the bus priorities can be chosen such that an energy system controlled by the method is thermally managed or is electrically managed. This can be effected for example on the basis of whether the priorities of buses for a thermal energy form are higher or whether the priorities of buses for an electrical energy are higher. Alternatively or additionally the bus priorities can be chosen such that buses and the generators thereof whose operating costs are lower or that have a higher performance level are used first. As such, for example the bus priorities can be determined on the basis of an earlier simulation of the energy system and used as predetermined values in the method. Accordingly, for example the bus priorities can be determined on the basis of physical attempts on such an energy system. In some variants it is also possible for the bus priorities to be determined and/or adapted in the method—for example based on an analysis of a behavior of the control by the method, on a user input or on external data such as for example weather data or data concerning an external energy network, for example data concerning utilization levels and/or costs of an electricity grid. In some variants the bus priorities can also be adapted on the basis of a time of day, a date and/or a day of the week, with different predetermined bus priorities that have been determined by a simulation or have been input by a user, for example, being able to be stored for different times of day/calendar days/days of the week, for example.

The aforementioned variants for determining the bus priorities can also be combined with one another.

In some embodiments, in which the buses each have an assigned or allocated bus priority, the method additionally comprises triggering a fresh iteration via one or more buses that have a higher bus priority than the selected bus and that are connected to the selected bus via a component that is labelled as non-fixed if the balancing for a selected bus is not successful. In this manner it is possible for the power budgets of these buses to be balanced in the order of their bus priority while regarding the components that are labelled as fixed as a result of the balancing of the power budget of the selected bus. In some variants the label is also converted from fixed to non-fixed only for those components that are connected to the selected bus only or to the selected bus and a bus having higher bus priority if the balancing for a selected bus is not successful.

A method for controlling an energy system having multiple buses connecting one or more consumers and one or more generators for energy transmission purposes is also provided, which can be computer-implemented. The method comprises balancing the buses in the order of their respective bus priority, e.g., as long as it is respectively possible to balance a bus selected in the order while regarding respective already balanced buses. Additionally, the method comprises balancing the selected bus without regard for the respective already balanced buses connected to the selected bus if balancing for the selected bus is not possible, and rebalancing the buses connected to the selected bus while regarding the other already balanced buses and the selected bus that is then balanced.

A computer-implemented method for controlling an energy system is also provided. In this case the energy system has one or more consumers and one or more generators connected to one another by multiple buses of the energy system for energy transmission purposes. The method comprises performing an iteration process via all of the buses, wherein a respective bus whose bus priority among those buses that are not balanced is highest is selected from the buses. An iteration for the respectively selected bus comprises determining a total power demand of the selected bus. Additionally, the respective iteration comprises balancing the total power demand, provided that this is possible, and labelling the respectively selected bus as balanced, wherein amounts of power to be provided by generators connected to the selected bus are respectively specified or have already been specified on the basis of balancing for another of the buses. Otherwise the respective iteration comprises labelling all of the buses connected to the respectively selected bus that do not have a lower priority than the selected bus as non-balanced, cancelling any specifications of amounts of power to be provided by generators that are not connected to a bus having a lower priority than the selected bus, and balancing the total power demand of the selected bus first.

A second aspect of embodiments of the invention relates to a computer program logic unit configured to carry out the method for controlling the energy system, in particular according to the first aspect.

The possible advantages, embodiments or variants of the first aspect of the invention also apply to the computer program logic unit accordingly.

A third aspect of embodiments of the invention relates to an apparatus for controlling an energy system having multiple components connected to one another by a multiplicity of buses of the energy system for energy transmission purposes, the components comprising generators and consumers, wherein the components are labelled as either non-fixed or fixed, depending on whether their energy operating point is specified. In this case the apparatus comprises a computer program logic unit or another control device that is configured to carry out a control method comprising:

performing an iteration process via all of the buses of the multiplicity of buses, an iteration for the respectively selected bus respectively comprising:

attempting to balance a power budget of the selected bus by specifying the energy operating points of components connected to the respective bus that are labelled as non-fixed;

if the balancing for the respective bus is successful: labelling all of the components connected to the respective bus as fixed, and if the balancing for the respective bus is not successful: converting the label of components connected to the respective bus from fixed to non-fixed, and triggering a fresh iteration for the respective bus.

Additionally, the apparatus—for example in interaction with the computer program logic unit or the control device—is configured to take this as a basis for generating a control signal and for controlling the energy system using the control signal.

The possible advantages, embodiments or variants of the preceding aspects of the invention also apply to the apparatus for controlling the energy system accordingly. The apparatus for controlling the energy system can also be configured to carry out such a method for controlling the energy system. Accordingly, a method for controlling the energy system can also comprise generating a control signal and/or controlling the energy system by the control signal.

A further aspect of embodiments of the invention relates to an energy system having an apparatus for controlling same according to the third aspect of embodiments of the invention and having multiple components connected to one another by a multiplicity of buses of the energy system for energy transmission purposes, the components comprising generators and consumers.

A further aspect of embodiments of the invention relates to a method for simulating an energy system in interaction with a control apparatus according to the third aspect of embodiments of the invention or with a method for controlling the energy system, for example according to the first aspect of embodiments of the invention. In this case the energy system has multiple components connected to one another by a multiplicity of buses of the energy system for energy transmission purposes, the components comprising generators and consumers, wherein the components are labelled as either non-fixed or fixed, depending on whether their energy operating point is specified. The simulation method comprises execution of multiple simulation steps, wherein the simulation steps each involve simulating a behavior of the components of the energy system and each involve carrying out the control method in accordance with a simulation of the control apparatus on the basis of a corresponding control method.

The possible advantages, embodiments or variants of the preceding aspects of the invention also apply to the further aspects of embodiments of the invention accordingly. An advantage of a simulation using such a control method can also be in particular that the control method requires less processing power, which means that it can be carried out in each simulation step efficiently and in accordance with a later—possibly physical by a control apparatus—implementation, allowing a high level of transferability of the simulation results to a later implementation to be achieved and/or allowing a multiplicity of simulations to be carried out in order to achieve a particularly suitable design for an energy system implemented on the basis of the simulation, with an associated apparatus for controlling same.

Further advantages, features and application options will emerge from the detailed description of exemplary embodiments that follows and/or from the figures.

BRIEF DESCRIPTION

Some of the embodiments will be described in detail, with references to the following Figures, wherein like designations denote like members, wherein:

FIG. 3 shows a flowchart of a method according to an embodiment with regard to balancing of buses of an energy system;

FIG. 4 shows a flowchart of a method according to an embodiment with regard to power optimization; and FIG. 5 shows a sequence for balancing buses of an energy system by a method according to an embodiment.

DETAILED DESCRIPTION

Figure 1:
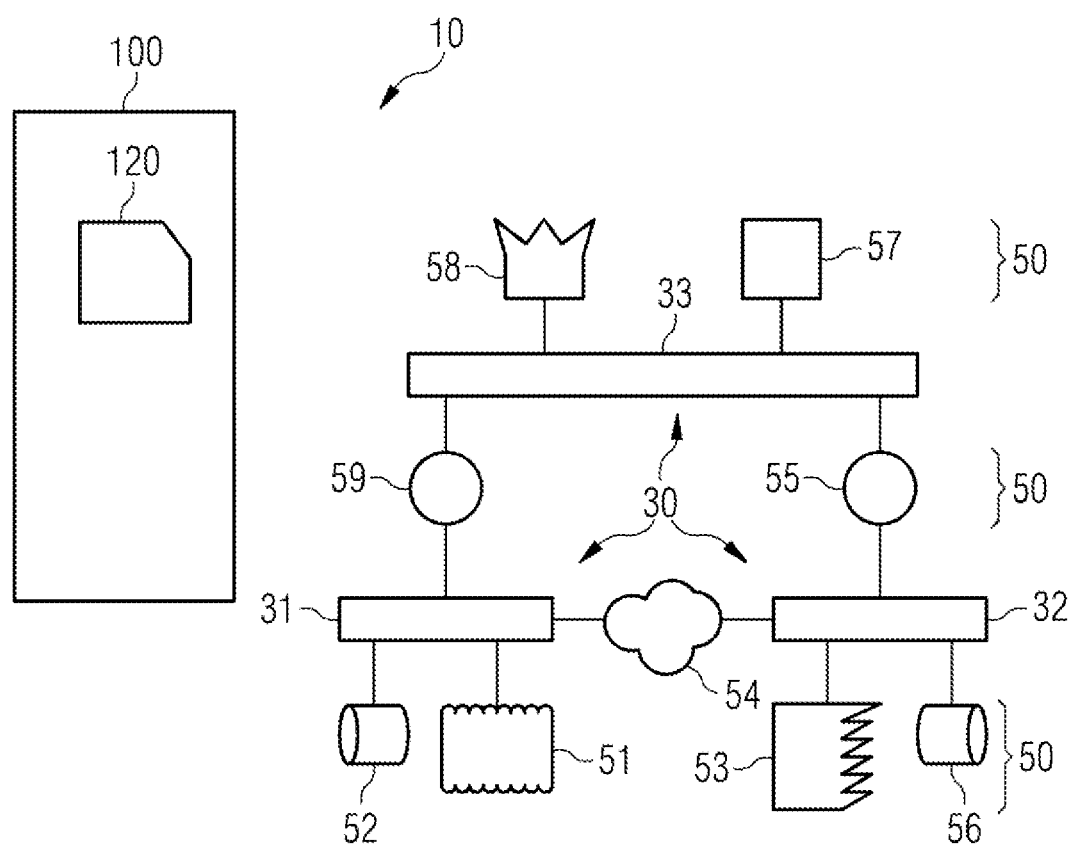
FIG. 1 shows an energy system having multiple buses and components and having an apparatus for controlling the energy system according to an embodiment.

The figures are schematic depictions of different embodiments and/or exemplary embodiments of the present invention. Elements and/or components depicted in the figures are not necessarily depicted to scale. On the contrary, the different elements and/or components depicted in the figures are reproduced such that their function and/or their purpose become comprehensible to a person skilled in the art.

Connections and couplings depicted in the figures between functional units and elements can also be implemented as indirect connections or couplings. In particular, data connections can be in wired or wireless form, that is to say in particular in the form of radio connections. Specific connections, for example electrical connections, for example for supplying power, may also not be depicted for the sake of clarity.

The text below describes techniques that allow rule-based control of a load distribution in hybrid energy systems having a bus topology. This can be accomplished by determining an energy operating point of components connected to a bus of the energy system, that is to say for example the electric power delivered by energy generators or the electric power consumed by loads. In this case it is possible to perform an iteration process via the different buses and, for each bus in the respective iteration, to attempt in each case to balance the power budget of the selected bus by specifying the energy operating points of the components connected to the respective bus. Only the operating points of components that are not yet labelled as "fixed" (that is to say components for which the operating point was not already specified in a preceding iteration and that are therefore not labelled as "fixed") can be selectively specified in this case. It is thus possible to gradually work through the different buses (e.g. in an outer logic loop) and the different components (e.g. in an inner logic loop). This can be performed up to a termination criterion, a wide variety of termination criteria being conceivable.

Such techniques can be combined with backtracking: sometimes iteratively processing buses and components in this way can result in an unresolvable situation, that is to say that the balancing of the power budget of a bus handled in a specific iteration fails. It would then be conceivable for components that were already labelled as "fixed" in an earlier iteration to be processed again so as still to allow determination of the operating points with a balanced power budget. If such renewed processing of buses also fails then—if an appropriate termination criterion is met—an error can be reported.

As a general rule, after the completion of the iterations via the different buses—that is to say after the operating points for all of the components have been specified—a downstream power optimization could take place. During the power optimization it would be conceivable for the operating points for the different components to be adapted. A wide variety of techniques related to power optimization can be applied in this case. Power optimization can allow fine adjustment of the previously stipulated operating points, as it were.

FIG. 1 schematically shows an energy system 10 having an apparatus 100 for controlling same according to an embodiment of the present invention.

In one exemplary embodiment the energy system 10 has multiple buses—for example two, three, five or more buses, that is to say for example a multiplicity 30 of buses—and multiple components 50, comprising generators and consumers, that have one energy operating point each—for example in the context of a minimum power and a maximum power—and are connected to one another by the multiplicity of buses 30 for energy transmission purposes. As such the energy system 10 in an exemplary embodiment of this kind, for which a sequence for balancing the buses is schematically depicted in FIG. 5, is in the form of a hybrid energy system. The hybrid energy system 10 has a hot water bus 31, to which a hot water load 51 as one of the consumers and a hot water grid connection 52 as one of the generators are connected, a cold water bus 32, to which a cold water load 53 as one of the consumers and a cold water grid connection 56 as one of the generators are connected, and an electrical bus 33, to which an electrical load 57 as one of the consumers and an electricity grid connection 58 as one of the generators are connected, and, as further hybrid generators of the components 50, an absorption refrigeration machine 54, which is connected to the hot water bus 31 and the cold water bus 32, a compression refrigeration machine 55, which is connected to the cold water bus 32 and the electrical bus 33, and a district heating power station 59, which is connected to the hot water bus 31 and the electrical bus 33.

In one exemplary embodiment the apparatus 100 for controlling the energy system 10 has a computer program logic unit 120 configured to carry out a method for controlling the energy system 10. In some variants this method comprises a method 20 described in connection with FIG. 2 or a method 200 described in connection with FIG. 3. In some variants the method also comprises at least:

performing an iteration process via all of the buses of the multiplicity of buses, an iteration for the respectively selected bus respectively comprising:
  attempting to balance a power budget of the selected bus by specifying the energy operating points of components connected to the respective bus that are labelled as non-fixed;
  if the balancing for the respective bus is successful: labelling all of the components connected to the respective bus as fixed, and
  if the balancing for the respective bus is not successful: converting the label of components connected to the respective bus from fixed to non-fixed, and triggering a fresh iteration for the respective bus.

The computer program logic unit 120 is additionally configured to take the energy operating points stipulated in the method as a basis for generating a control signal, provided that balancing has been possible for all of the buses, and otherwise an error signal—if e.g. an applicable termination criterion is met. The apparatus 100 is additionally configured to control the energy system 10, the respective energy operating points of the components 50 being stipulated on the basis of the control signal and/or the error signal resulting in the energy system 10 being put into a safe state, the energy operating points being left unchanged—for example in accordance with a preceding time step for controlling the energy system—and/or the control method being produced on the basis of the method being carried out again for a further time step. In some variants the apparatus 100 has a data connection to the components 50 of the energy system 10. In some variants the apparatus 100 also has a data connection to the multiplicity of buses 30, for example for the purpose of monitoring the actual energy flows—that is to say the amounts of power respectively transmitted via the respective bus.

Figure 2:
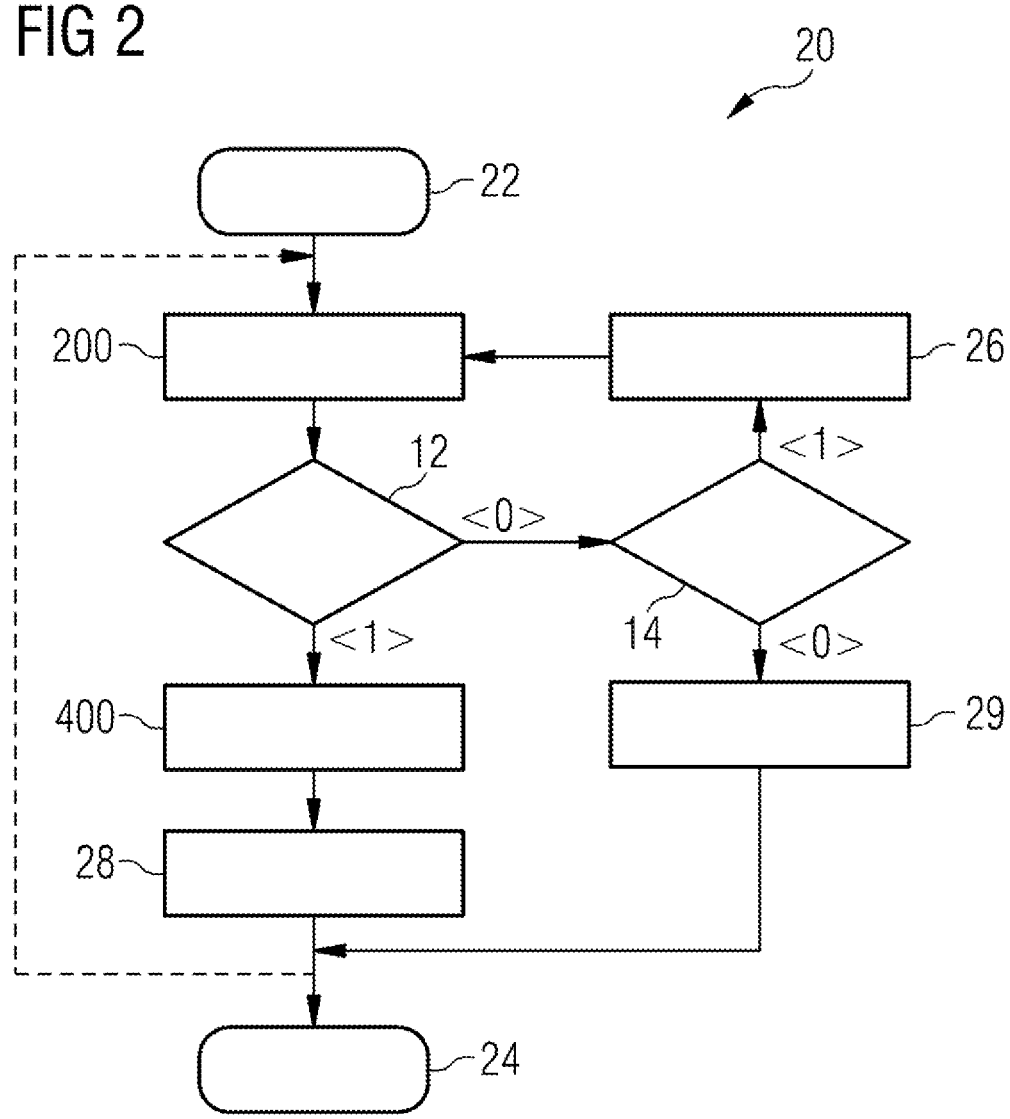
FIG. 2 shows a flowchart of a method according to an embodiment for controlling an energy system.

FIG. 2 schematically shows a flowchart of a method 20 for controlling an energy system according to an embodiment of the present invention.

In one exemplary embodiment the energy system corresponds to the energy system 10 described in connection with FIG. 1.

In one exemplary embodiment the method 20 begins at the method start 22 and ends at the method end 24. The method 20 comprises method steps 26, 28, 29, 200 and 400 and method conditions 12 and 14. Some of the method steps—for example method steps 200 and 400—can themselves each be a method according to an embodiment of the present invention or a partial method of such a method. It is also possible for individual method steps, a succession of method steps or the whole method to be executed repeatedly several times, for example for one time step for controlling the energy system each.

In method step 200 the power budgets of the buses are balanced, if possible, and the energy operating points of the components of the energy system are stipulated. In some variants this is accomplished by carrying out a method 200, as described in connection with FIG. 3.

At method condition 12 a check is performed to determine whether the power budgets of the buses are balanced and accordingly the energy operating points were able to be stipulated.

In this case—symbolized by <1>—a power optimization is carried out in method step 400 by one or more measures, the power optimization involving at least some of the previously stipulated energy operating points being adapted. In some variants this is accomplished by carrying out a method 400, as described in connection with FIG. 4.

Otherwise—symbolized by <0>—a check is performed at method condition 14 to determine whether load shedding is possible, that is to say whether at least one of the consumers is a sheddable load that has not yet been shed. In this case—symbolized by <1>—method step 26 is executed; otherwise method step 29 is executed.

In method step 29 an error signal is generated that signals that it has not been possible to find a solution for a load distribution of the energy system.

After method step 29 the method 20 can be carried out again for a further time step during control of the energy system—and for example with different power demands and/or possibly providable amounts of power—or ended at the method end 24.

In method step 26 a sheddable load whose component priority is highest among one or more sheddable loads of the consumers that have not yet been shed is selected from the consumers. This selected sheddable load is then shed, that is to say for example its power demand is set to zero. The method 20 is then carried out again, with all of the components being labelled as non-fixed and the performance of an iteration process via all of the buses being re-initialized.

After method step 400, in method step 28 a control signal is generated on the basis of method steps 200 and 400 or a control signal generated in either of method steps 200 and 400 is used that characterizes at least the stipulated energy operating points, and the control signal is used to control the components. The method 20 can be carried out again for a further time step during control of the energy system—and for example with different power demands and/or possibly providable amounts of power—or ended at the method end 24.

FIG. 3 schematically shows a flowchart of a method 200 according to an embodiment of the present invention with regard to balancing of buses of an energy system during control of an energy system.

In one exemplary embodiment the energy system corresponds to the energy system 10 described in connection with FIG. 1. In one exemplary embodiment the method 200 is also carried out as part of the method 20 described in connection with FIG. 2.

In one exemplary embodiment the method 200 is implemented with a backtracking algorithm. Within the spirit of the disclosure a backtracking algorithm attempts to determine an overall solution on the basis of partial solutions reached, wherein if an attempt to reach a partial solution fails—that is to say for example a power budget of a bus cannot be balanced—one or more of the partial solutions are withdrawn and an attempt is made to reach alternative partial solutions for these withdrawn partial solutions.

In one exemplary embodiment the method 200 begins at the method start 202 and ends at the method end 204. The method 200 comprises method steps 220, 222, 224, 230, 232, 240, 242, 244, 246, 248, 260, 250, 252, 254, 228 and 258 and method conditions 210, 212, 214, 216 and 218. Individual method steps, a succession of method steps or the whole method can be executed repeatedly several times, for example for one time step for controlling the energy system each.

In method step 220 each of the buses is allocated a respective bus priority.

In method step 222 a list of all buses is compiled that is ordered in accordance with the bus priorities, which means that for example the bus that has the highest priority is the first element in the list and the bus that has the lowest priority is the last element in the list.

In method step 230 an iteration process is performed via all of the buses, that is to say via all of the elements in the list. In this case method step 230 comprises method steps 232, 240, 250, 252 and 254 and method condition 210 and 218.

At method condition 210 a check is performed to determine whether the list contains at least one bus. If this is the case—symbolized by <1>—method step 232 is executed. If this is not the case—symbolized by <0>—the method 200 is continued at method condition 212.

In method step 232 the first element from the list, that is to say for example the bus having the highest priority among the buses in the list, and hence the bus, is selected as selected bus and the element is removed from the list—or accordingly an index for the list that respectively points to an element to be selected is increased by one each time beginning from zero for the first iteration. Method step 240 is then executed for the bus that is therefore selected in each case.

In method step 240 an attempt is made to balance a power budget of the respectively selected bus. In this case method step 240 comprises method steps 242, 244, 246, 248 and 260 and method conditions 214 and 216.

In method step 242 a respective minimum power and a respective maximum power with regard to the selected bus are determined for each generator of the components of the energy system that is connected to the selected bus. A respective possible power demand stipulated on the basis of a stipulation of an energy operating point of the respective hybrid generator for another of the buses, or an accordingly stipulated minimum or maximum power demand or else a minimum power and maximum power restricted as appropriate on the basis of the stipulation for the other of the buses, is also determined for any hybrid generators connected to the selected bus. A respective minimum and maximum power demand of the consumers of the components of the energy system that are connected to the selected bus can also be determined accordingly, provided that their respective power demand is controllable and/or can be adapted, or a respective, in particular fixed, power demand of the consumers can be determined.

In method step 244 a total power demand of the selected bus is determined on the basis of the respective minimum and maximum power demands or the fixed power demand of consumers connected to the bus and possibly of hybrid generators. In some variants this is accomplished by calculating the sum of the minimum power demands—of the consumers, which are controllable/adaptable, and of the hybrid generators—and of the fixed power demands of the other consumers connected to the selected bus and of the other hybrid generators, which have a power demand on the basis of a stipulation for another of the buses.

In method step 246 a sum of the provided amounts of power or minimum powers of hybrid generators possibly connected to the respectively selected bus whose respectively provided amount of power or amount of power in accordance with their respective minimum power is stipulated on the basis of a stipulation of their operating point with regard to another of the buses is calculated. Additionally, a remaining part of the total power demand is calculated, the sum of the provided amounts of power and minimum powers being deducted from the total power demand.

At method condition 214 the method is continued on the basis of the remaining part of the total power demand: if the remaining part is at least substantially zero—that is to say the attempt at balancing the power budget of the selected bus is successful—energy operating points of generators possibly still labelled as non-fixed on the selected bus are labelled as fixed and their respective amount of power to be provided is stipulated to be zero or—for example in the case of hybrid generators whose minimum power is stipulated on the basis of a stipulation for another of the buses—to be the respective minimum power and then the method 200 is continued at method condition 210; if the remaining part is at least substantially negative—that is to say for example there is excess power on the selected bus—at method step 260; and if the remaining part is at least substantially positive—that is to say the power budget on the selected bus is not balanced and there is a further power demand—at method condition 216.

In method step 260, if one or more of the consumers are power shedding loads, the total power demand of the selected bus is increased by such a power shedding load connected to the selected bus. The—possibly negative—remaining part of the total power demand is increased accordingly in this case. In some variants thereof the power shedding loads have assigned component priorities, the total power demand being increased in accordance with the component priorities of the power shedding loads, in each case with that power shedding load by which no power has been shed yet previously. The method 200 is then continued at method condition 214.

At method condition 216 a check is performed to determine whether one or more of the generators connected to the selected bus are labelled as non-fixed and/or an energy operating point of such a generator is not yet stipulated for the selected bus. If this is the case—symbolized by <1>—the generator having the highest priority of these generators is selected in method step 248, its energy operating point is stipulated such that the accordingly provided amount of power thereof balances the remaining part of the total power demand or at least reduces it in accordance with the maximum power of this generator—that is to say this generator provides its maximum power as the amount of power—, this generator is labelled as fixed and the method 200 is continued at method condition 214. Otherwise—that is to say the balancing of the power budget of the respectively selected bus is not successful for this execution of method step 240, symbolized by <0>—the method 200 is continued at method step 250.

In method step 250 the components connecting the selected bus to a bus that has a higher priority than the selected bus and—in some variants—components that are connected to the selected bus only are labelled as non-fixed. Accordingly, in some alternative variants, the components that are connected to at least one bus from the list are labelled as non-fixed. That is to say in some variants, within the spirit of backtracking, partial results—that is to say for example stipulations of operating points and/or amounts of power, for example for components that are not connected to a bus with lower priority—are cancelled.

In method step 252 a fresh attempt at balancing the selected bus in accordance with method step 240 is made, wherein amounts of power or maximum powers possibly providable by generators connected to the selected bus are no longer restricted on the basis of a stipulation for another of the buses—in particular a bus having higher bus priority—that is to say, for example without regard to possible stipulations for other buses, the total power demand of the selected bus can be balanced and/or the total power demand is possibly lower on the basis of hybrid generators that are not yet fixed.

At method condition 218 a check is performed to determine whether the balancing in method step 252 was successful, and in this case—symbolized by <1>—method step 254 is executed; if not—symbolized by <0>—method step 258 is executed.

In method step 254 a fresh iteration via one or more buses that have a higher bus priority than the selected bus and that are connected to the selected bus via a component that is labelled as non-fixed is triggered. This is accomplished by compiling a further list containing those buses—for example from the previous list—that have a higher priority than the selected bus and are connected to the selected bus via at least one component, and the method 200 is carried out recursively from method step 230 for this list compiled in method step 254. In some variants, that is to say within the spirit of backtracking, alternative partial results are determined on the basis of the balancing of the selected bus in method step 252 and the list compiled in method step 254.

At method condition 212 a check is performed to determine whether at least one list from a preceding recursion or the list compiled in method step 222 still contains at least one element. In this case—symbolized by <1>—method step 224 is executed. Otherwise—symbolized by <0>—method step 228 is executed.

Accordingly, in some variants, those buses that are in at least one of the lists can be labelled as non-balanced and/or those buses that are (now) in none of the lists—and that are possibly not the selected bus—can be labelled as balanced.

In method step 224 the at least one list from the respectively preceding recursion, which still has at least one element, or the list compiled in method step 222 is selected. The method 200 is then continued from method step 230 with this selected list.

In method step 228 a control signal is generated that characterizes the stipulated energy operating points of the components and denotes that the balancing of the buses is successful. In some variants method step 228 can also be executed if all of the components are labelled as fixed.

In method step 258 an error signal is generated that characterizes that—for example at least for a present time step in the control—the balancing of the power budget of the buses is not successful.

In some variants method step 258 can also be executed if the attempt at balancing fails too frequently for at least one bus or a predetermined period of time has elapsed.

After method step 228 or 258 the method can end at the method end 204 or can be continued—for example for a further time step in the control—at method step 220, at which for example new priorities are allocated for the further time step, or at method step 222.

In some variants method step 228 is combined with or replaced by a method step 28, as described with regard to FIG. 2. In some variants method step 258 is combined with or replaced by a method step 29, as described with regard to FIG. 2.

In some modified variants backtracking is implemented in such a way that no recursion for the lists or no lists are required. As such, in some variants thereof, the buses are represented by a tree structure, for example with regard to their priority and a label concerning whether a respective bus is already balanced. The performance of an iteration process respectively involves the bus that has the highest priority among the buses that are not (yet) or no longer labelled as balanced being selected. If balancing fails for the respectively selected bus, all of the buses with higher priority connected to the selected bus are labelled as non-balanced—that is to say for example a label as "balanced" is cancelled—and accordingly stipulations of operating points of components on the selected bus only or on the selected bus and one of the buses having higher priority are cancelled. A termination criterion for the performance of an iteration process is that all of the buses are labelled as balanced or balancing has failed too frequently for one of the buses.

FIG. 4 schematically shows a flowchart of a method 400 according to an embodiment of the present invention with regard to power optimization during control of an energy system.

In one exemplary embodiment the energy system corresponds to the energy system 10 described in connection with FIG. 1. In one exemplary embodiment the method 400 is also carried out as part of the method 20 described in connection with FIG. 2.

In one exemplary embodiment the method 400 begins at the method start 402 and ends at the method end 404. The method 400 comprises method steps 420, 430 and 440. Individual method steps, a succession of method steps or the whole method can be executed repeatedly several times, for example for one time step for controlling the energy system each.

In method step 420 any excess powers, if not intended to be used locally, are routed to generators having feedback capability such as for example grid connections via the buses and are exported by the generators having feedback capability, and any remaining excess powers are loaded into any stores in the energy system. In some variants thereof one of the measures performed during power optimization is therefore energy exchange control, with external load balancing being performed first—that is to say for example excess powers being routed to generators having feedback capability with external resources and/or to at least one grid connection—and internal load balancing then being performed for any remaining excess powers—that is to say remaining excess powers being stored in a store in the energy system, for example, and/or that is to say being routed via buses, for example, and/or transmitted between buses by one or more hybrid generators. If excess powers are intended to be used locally, any stores connected to a bus on which excess power occurs are loaded first; remaining excess powers are transmitted to other buses according to the bus priorities and loaded into any stores there or are exported via grid connections to supply grids connected to the grid connections. In some variants thereof one of the measures performed during power optimization is therefore energy exchange control, with internal load balancing being performed first and external load balancing then being performed for any remaining excess powers. In this case the operating points of the generators having feedback capability such as grid connections or stores in the energy system are adapted accordingly. In some variants the external and internal load balancing can also be combined on the basis of a local use parameter such that some of the excess powers are first used for internal load balancing in accordance with the local use parameter—for example a particular percentage or a particular absolute amount of power—and remaining excess powers are used for external load balancing.

In method step 430 peak loads when importing energy—that is to say for example in the case of external resources, for example from supply grids—are reduced by discharging stores in the energy system.

Additionally, in method step 430, costs of an external resource are determined and this is taken as a basis for determining whether a power in an energy form of this external resource is supposed to be imported and stores in the energy system are supposed to be loaded, or whether such importing is supposed to be reduced by providing amounts of power by discharging stores in the energy system or a power in the energy form of the external resource is supposed to be exported to an applicable supply grid—for example by virtue of stores in the energy system being discharged and thus providing amounts of power. In some variants the costs of an external resource are also taken as a basis for increasing excess power in such a way—for example by virtue of the operating point of a generator, in particular a resource-dependent and/or hybrid generator, being adapted, and the generator being controlled by a control signal, such that the generator supplies an increased amount of power to a bus—that excess power is produced or increased on this bus and the possibly increased excess power is exported by a component with regard to the external resource—that is to say is possibly supplied to a supply grid for this external resource.

In this case the operating points of the generators having feedback capability, such as grid connections or stores in the energy system, are adapted accordingly. In this advantageous manner supply grids can each be stabilized for supply using an external resource and/or costs based on use of an external resource of this kind can be reduced and/or tariff variations with regard to such a resource can be used.

In method step 440 one measure performed for power optimization is store management, which involves one or more store management parameters being taken as a basis for determining whether a store in the energy system is supposed to be charged or discharged. As such, for example in some variants, a battery as a store in the energy system can be charged or discharged to a predetermined preferred fill level as a store management parameter. In some variants discharging the battery can involve discharge in accordance with a planned discharge period as a further store management parameter. The operating points of the stores are adapted accordingly.

FIG. 5 schematically shows a sequence for balancing buses of an energy system by a method according to an embodiment, wherein the energy system 10 is described in connection with FIG. 1, for example, and the method is described in connection with FIG. 3, for example.

In the sequence of an exemplary embodiment of this kind the energy operating points of the components of the energy system can be stipulated in rule-based fashion on the basis of a backtracking algorithm. In the text that follows, the bus 31 from FIG. 1 is also referred to as "HW-B", the bus 32 is referred to as "CW-B" and the bus 33 is referred to as "E-B", and the component 51 is referred to as "HW load", the component 52 is referred to as "HW-GC", the component 53 is referred to as "CW load", the component 54 is referred to as "AR", the component 55 is referred to as "CC", the component 56 is referred to as "CW-GC", the component 57 is referred to as "E load", the component 58 is referred to as "E-GC" and the component 59 is referred to as "DHPS".

The components can have for example the following power demands, providable amounts of power or maximum powers and also further properties such as efficiency—for example for hybrid generators:

Bus 31: hot water bus (HW-B).
a) HW load: 500 kW;
b) Absorption refrigeration machine: 1000 kW (efficiency 50%);
c) District heating power station: 2000 kW (electrical/thermal ratio=1/1);
d) HW grid connection: 1000 kW.

Bus 32: cold water bus (CW-B)
a) CW load: 600 kW;
b) Absorption refrigeration machine: 500 kW;
c) Compression cooler: 250 kW (electrical~thermal efficiency=50%);
d) CW grid connection: 1000 kW.

Bus 33: electrical bus (E-B)
a) Electrical load: 1000 kW;
b) District heating power station: 2000 kW;
c) Compression cooler: 500 kW;
d) E grid connection: 100 kW.

The following sequence 500 and a final result 528 could therefore be obtained:

| Step | Name Start | Description State before algorithm |
|---|---|---|
| 501 | Balance HW-B | Balance HW-B with all - i connected components |
| 502 | Balance CW-B | Balance CW-B with non-fixed components |
| 503 | | Balance E-B with non-fixed components -> Not possible because E-GC max. 200 kW |

-continued

| Step | Name Start | Description State before algorithm |
|---|---|---|
| 504 | Re-Balance E-B | Reset all components on CW-B and connected buses with higher priority (HW-B & CW-B), balance E-B and backtrack HW-B & CW-B |
| 505 | Re-Balance HW-B (in backtracking from step 504) | Balance HW-B with non-fixed components |
| 506 | Re-Balance CW-B (in backtracking from step 504) | Balance CW-B with non-fixed components -> Not possible because CW-GC max. 200 kW |
| 507 | Re-Re-Balance CW-B | Reset all components on CW-B and connected buses with higher priority (HW-B), balance CW-B and backtrack HW-B |
| 508 | Re-Re-Balance HW-B (in backtracking from step 507) | Balance HW-B with non-fixed components |

In steps 501 to 508 the operating points of the components—that is to say e.g. a thermal power provided on the bus 31 as an amount of power, provided in the form of thermal energy, of the electrically operated district heating power station 59 and a corresponding power demand in the form of electrical energy on the bus 33—are each stipulated accordingly. It therefore follows, "Status" respectively indicating the load, as part of the respective total power demand on the respective bus, that results from the power demands of the respective consumers—that is to say for example HW load, CW load or E load—that:

| Step | Status HW-B (load = 500 kW) | Status CW-B (load = 600 kW) | Status E-B (load = 1000 kW) |
|---|---|---|---|
| (Start) | AR = 0 kW; DHPS = 0 kW; HW-GC = 0 kW. | AR = 0 kW; CC = 0 kW; CW-GC = 0 kW. | DHPS = 0 kW; CC = 0 kW; E-GC = 0 kW. |
| 501 | AR = 0 kW; DHPS = 500 kW; HW-GC = 0 kW. | AR = 0 kW; CC = 0 kW; CW-GC = 0 kW. | DHPS = 500 kW; CC = 0 kW; E-GC = 0 kW. |
| 502 | AR = 0 kW; <u>DHPS = 500 kW;</u> HW-GC = 0 kW. | AR = 0 kW; CC = 500 kW; CW-GC = 100 kW. | <u>DHPS = 500 kW;</u> CC = −250 kW; E-GC = 0 kW. |
| 503 | AR = 0 kW; <u>DHPS = 500 kW;</u> HW-GC = 0 kW. | AR = 0 kW; <u>CC = 500 kW;</u> <u>CW-GC = 100 kW.</u> | <u>DHPS = 500 kW;</u> <u>CC = −250 kW;</u> *<u><u>E-GC = 200 kW.</u></u>* |
| 504 | AR = 0 kW; DHPS = 1000 kW; HW-GC = 0 kW. | AR = 0 kW; CC = 0 kW; CW-GC = 100 kW. | DHPS = 1000 kW; CC = 0 kW; E-GC = 0 kW. |
| 505 | AR = −500 kW; <u>DHPS = 1000 kW;</u> HW-GC = 0 kW. | AR = 250 kW; CC = 0 kW; CW-GC = 100 kW. | <u>DHPS = 1000 kW;</u> CC = 0 kW; E-GC = 0 kW. |
| 506 | AR = −500 kW; <u>DHPS = 1000 kW;</u> HW-GC = 0 kW. | AR = 250 kW; CC = 0 kW; *<u><u>CW-GC = 200 kW.</u></u>* | <u>DHPS = 1000 kW;</u> CC = 0 kW; E-GC = 0 kW. |
| 507 | AR = −1000 kW; <u>DHPS = 1000 kW;</u> HW-GC = 0 kW. | AR = 500 kW; <u>CC = 0 kW;</u> CW-GC = 100 kW. | <u>DHPS = 1000 kW;</u> CC = 0 kW; E-GC = 0 kW. |
| 508 | AR = −1000 kW; <u>DHPS = 1000 kW;</u> HW-GC = 500 kW. | AR = 500 kW; CC = 0 kW; CW-GC = 100 kW. | <u>DHPS = 1000 kW;</u> CC = 0 kW; E-GC = 0 kW. |

Already stipulated operating points and components or amount of power/power demand fixed thereby are depicted in underlined form, an operating point that is changed in the respective step is depicted in bold and an unbalanceable remaining part of a total power demand is depicted in double-underlined italicized form.

The above also gives rise to the following versions, and/or the versions are implemented by the above by way of illustration.

In some embodiments one or more of the consumers are power shedding loads. In some embodiments thereof the method comprises increasing a total power demand of the selected bus by such a power shedding load connected to the selected bus if there is excess power when balancing the power budget of the selected bus.

In some embodiments excess power on one of the buses is also shed by one or more power shedding loads in the order of their priority.

An advantage of shedding excess power by a power shedding load can be in particular that robustness of the control can be increased.

In some embodiments, after all of the components are labelled as fixed, the method additionally comprises performing power optimization by one or more measures, the power optimization involving at least some of the previously specified operating points being adapted.

In some embodiments excess power on one of the buses is also fed back by one or more generators having feedback capability in the order of their priority.

In some embodiments one or more of the generators are also generators having feedback capability. In this case the method additionally comprises performing power optimization, wherein, for at least one of the buses, excess power on this bus results in the excess power or a portion thereof being supplied to such a generator having feedback capability that is connected to this bus.

An advantage of power optimization and/or of feedback can be in particular that—after a solution has been found for load balancing and therefore all of the components have first been labelled as fixed—the energy operating points can be optimized further and any excess powers can be fed back, as a result of which cost efficiency for energy generation can be increased and/or networks for supplying energy—such as for example electricity grids, district heating networks, district cooling networks or fuel networks—can be relieved of load. It also becomes possible to compensate for possibly super-optimum parameterizations such as for example for the bus priorities or the priorities of the generators and/or consumers by such downstream power optimization, which allows energy efficiency within the energy system to be increased, meaning that the method gains further robustness.

In some embodiments a generator having feedback capability is an energy store or a grid connection such as for example a connection to an electricity grid, a connection to a district heating supply or a connection to a district cooling supply.

In some embodiments in which power optimization is performed the one or more measures comprise at least one from storing excess power on one bus of the multiplicity of buses in energy stores, exchanging the excess power between buses of the multiplicity of buses, and delivering the excess power via an external grid connection of the energy system.

In some embodiments in which power optimization is performed one or more of the generators are resource-dependent generators. The excess power for a bus connected to the resource-dependent generator is increased if a predetermined criterion with regard to a resource is met for the resource-dependent generator.

Within the context of the disclosure a "resource-dependent generator" is intended to be understood to mean at least one generator that needs an internal or external resource in order to provide an amount of power. A resource-dependent generator of this kind can require a conventional supply as a resource, for example—that is to say for example: can be a grid connection for a power supply grid, a drawing of electrical energy from the power supply grid giving rise to costs and/or peak loads on the power supply grid being supposed to be avoided; or can be a fuel-operated power station that requires an appropriate fuel as a resource. Accordingly it may be desirable to reduce consumption of such a resource during power optimization. A resource-dependent generator of this kind can also require what is known as a renewable energy form—for example solar energy or geothermal energy—as a resource for example, which is possibly freely available and therefore gives rise to at least substantially no costs, which means that use thereof can be increased—where possible—during power optimization.

In some embodiments in which power optimization is performed the one or more measures comprise energy exchange control for an external grid connection of the energy system. In some variants the energy exchange control comprises at least one from internal and external load balancing.

In some variants in which power optimization is performed the one or more measures are selected in accordance with a stipulated prioritization.

In some embodiments one or more of the generators are energy stores that each have a fill level and/or a priority, and wherein during the balancing of the power budget of the respective bus it is determined for at least one such energy store connected to the respective bus, based on the fill level and/or priority of the energy store, whether a specific amount of power is provided thereby or fed back thereto. In some variants at least one of the energy stores has a preferred fill level, the preferred fill level moreover being used to determine whether it absorbs any excess power from the respectively selected bus or delivers an amount of power to the respectively selected bus. In some variants the energy store is a flywheel, a battery or a thermal store. At least one of the energy stores can also have one or more store management parameters—for example a planned discharge period—used to decide how quickly the store is supposed to be charged or discharged if not needed for the balancing.

In some embodiments the energy system has or consists of a hybrid energy system. In some embodiments thereof the hybrid energy system has one or more hybrid generators as components, in particular as one or more of the generators.

Within the context of the disclosure a "hybrid energy system" is intended to be understood to mean at least one system for distributing amounts of power via one or more buses, the amounts of power being provided in the form of different energy forms. Such energy forms can be electrical energy or various thermal energies—such as for example cold water, hot water or steam—or fuels such as for example oil, city gas, methane gas, . . . butane gas or hydrogen gas. A hybrid energy system of this kind can be a microgrid—that is to say for example a smart and/or locally delimited electricity grid. A hybrid energy system of this kind can also be for example an energy supply system of a building, the energy supply system being configured to provide a supply of electric power, hot water, cold water and heating—for example by hot water, heated air or electrically generated thermal radiation.

An energy system within the context of the disclosure can have one or more components, such a component being able to be a consumer that has a demand for a specific energy form—that is to say a, possibly predetermined, power demand for a specific amount of power in this specific energy form—or a generator that can provide an energy form—that is to say a predetermined or specifiable amount of power in this energy form.

Within the context of the disclosure a "hybrid generator" is intended to be understood to mean at least one generator in the energy system that is connected to at least two buses of the multiplicity of buses. In some variants a hybrid generator of this kind can convert one of the energy forms provided in the hybrid energy system into another of the energy forms for which there is a demand in the hybrid energy system, that is to say can be an energy converter, for example. As such a hybrid generator of this kind or for example an energy converter as a hybrid generator can be: a district heating power station—which generates electrical energy and thermal energy—, an absorption refrigeration machine, which converts hot water or steam into cold water—or a compression refrigeration machine—which uses electrical energy to produce cold water. In some variants a hybrid generator of this kind can also provide a respective amount of power in a respective energy form for the respective instance of the at least two buses. As such a hybrid generator of this kind can be for example a solar installation that converts a resource—that is to say for example solar energy, which, as an external resource and renewable energy (form), does not need to be provided via the energy system or an energy supply grid connected thereto—both into electrical energy and into thermal energy such as hot water. Furthermore, a hybrid generator can also be connected to more than two buses, for example gas-operated cogeneration unit that converts a fuel—that is to say a resource such as for example city gas—both into electrical energy and into thermal energy such as hot water. In this case the city gas or more generally the resource can be provided via the energy system, that is to say for example via an appropriate generator and a supply grid connected thereto, for example a gas connection, and accordingly taken into consideration for control or, alternatively, treated as an external resource, which is subject to any external influences and/or can be an external factor for the method—for example sunshine in the case of a solar installation or costs for gas in the case of a gas-operated component such as the cogeneration unit—, the availability or provision of which is not controlled by the method, however.

A "bus" within the context of the disclosure is intended to be understood to mean at least one transmission unit for a power in the form of a specific energy form, wherein one or more generators configured to provide an amount of power in this specific energy form and one or more consumers that have a power demand in this specific energy form are connectable to the bus in such a way that energy in this specific energy form can be transmitted from one of the generators to one of the consumers. Such a bus can be, for example: a pipeline, air distribution system—for example for hot air or for cold air—, an electrical cable or a shaft—for example for transmitting a rotational movement. Such a bus can be configured to buffer-store a specific maximum amount of the respective energy form. On the other hand, this maximum amount can be relatively small or such a bus may not be configured to store the energy form transmitted by it, which means that—at least substantially—power demands of consumers connected to the bus need to be balanced by accordingly provided amounts of power from generators connected to the bus; it may accordingly also be necessary for provided amounts of power supplied to the bus to be removed from the bus again by consumers in order to compensate for or avoid excess power.

"Excess power" within the context of the disclosure is intended to be understood to mean at least that a sum of amounts of power provided by generators connected to the bus exceeds a total power demand on the bus.

In some embodiments a performance level of one of the buses, several of the buses or all of the buses is unrestricted, which means that the bus can respectively transmit any desired amount of power in its respective energy form.

Alternatively, in some embodiments, a performance level of at least one of the buses is restricted, this at least one bus being able to transmit only a limited amount of power in the respective energy form, wherein balancing this at least one bus involves the restricted performance level being taken into consideration such that the total power demand for this at least one bus—provided that the total power demand is adaptable and in particular reducible for example on the basis of sheddable loads, on the basis of loads whose power demand is controllable/adaptable between a minimum power demand and a maximum power demand, or on the basis of hybrid generators—does not exceed the performance level of this at least one bus and possibly is reduced accordingly.

In some embodiments one or more of the generators are hybrid generators connected to at least two buses of the multiplicity of buses. The amount of power provided by a hybrid generator of this kind on one of the respective at least two buses corresponds to an additionally provided amount of power on another of the respective at least two buses or to a power demand on the other of the respective at least two buses.

In some embodiments a hybrid generator is also configured to supply or remove a first amount of power to or from a first of the buses and to supply or remove a second amount of power to or from a second of the buses, the first amount of power corresponding to the second amount of power.

In some embodiments in which one of the components is a hybrid generator the respective attempt at balancing the power budget of the selected bus comprises determining a total power demand on the basis of the power demands of the loads connected to the selected bus and the possible power demand of the hybrid generator, provided that it is connected to the selected bus.

In some embodiments in which one of the components is a hybrid generator the respective attempt at balancing the power budget of the selected bus comprises balancing a total power demand of the respectively selected bus by the second amount of power, where possible and provided that the hybrid generator is connected to the selected bus and its first amount of power is already specified when an already balanced bus is balanced. Furthermore, the attempt comprises subsequently balancing a remaining part of the total power demand by the generators that are connected to the selected bus.

In some embodiments the method additionally comprises allocating component priorities to the components of the respective bus and specifying the energy operating points, when attempting to balance the power budget, in an order in accordance with the component priorities. In this advantageous manner it is possible to improve a load distribution achieved for the method. In some variants the component priorities indicate the order in which the applicable generators and consumers on the respective bus are supposed to contribute to balancing the power budget. In some variants the component priorities can be determined or selected according to the operational costs of the components, a performance level of the components, an operational safety of the components or else a short-term controllability of the components. The above with regard to the bus priorities applies accordingly for the component priorities, their advantages and opportunities—like specific developments or variants of the method—for determining same. As such for example the component priorities can also be predetermined by a simulation or for example may be dependent on a time of day or an external influencing factor. As such, for example in the case of a solar installation as a component of the energy system, the priority of the solar installation may be high in good weather during the day, whereas it is low in bad or changeable weather or at night.

In some embodiments hybrid generators have a higher priority than non-hybrid generators. In this advantageous manner the respective total power demand on the respectively selected bus can first be balanced by using amounts of power, for example excess power on one of the other buses—for example by converting an energy form of another bus into the respective energy form for the respectively selected bus, for example by a hybrid generator, that is to say for example of an energy converter.

In some embodiments the respective attempt at balancing the power budget of the respectively selected bus also involves a total power demand or a remaining part thereof being balanced by the generators connected to the respectively selected bus in the order of their respective priority, with a respective amount of power to be provided being specified.

In some embodiments the generators each have a minimum power and a maximum power for each of the buses connected to them. The attempt at balancing the power budget of the respectively selected bus comprises balancing by those of the generators that are connected to the selected bus, the respective amount of power to be provided by the generators being specified in the range between their minimum power and their maximum power for the selected bus. In particular in the case of hybrid generators their minimum power and/or their maximum power may already be changed and for example restricted on the basis of preceding balancing of another of the buses, for which an amount of power to be provided for this other of the buses has been specified and the respective hybrid generator has been fixed accordingly. Conversely—for example if the balancing for the respective bus is not successful—any restriction of the minimum power or maximum power is cancelled accordingly when the label is converted from fixed to non-fixed. In the case of hybrid generators connected to more than two buses there is accordingly the possibility of repeated restriction and possible cancellation of this restriction.

In some embodiments the performance of an iteration process is continued up to a termination criterion. The termination criterion comprises one or more of the following elements: all of the components are labelled as fixed; the attempt at balancing fails too frequently for at least one bus.

In some embodiments, if it is not possible to balance one of the buses—possibly even after all of the components connected to this bus have been labelled as non-fixed—then the method additionally comprises shedding of a sheddable load and a fresh attempt at balancing this bus or performance of a fresh iteration process via all of the buses, the components first being labelled as non-fixed.

In some embodiments one or more of the consumers are sheddable loads and/or one or more power shedding loads are sheddable loads. If the balancing for a selected bus is not successful or the balancing of all of the buses is not successful—that is to say for example there is a termination criterion—then one or more sheddable loads are shed, all of the components are labelled as non-fixed, and the performance of an iteration process via all of the buses is re-initialized.

In some embodiments in which one or more sheddable loads are shed, the sheddable loads are each assigned a component priority and the sheddable loads are shed in accordance with an order of their respective component priority until the balancing of the power budget for all of the buses is successful or none of the sheddable loads can still be shed, that is to say all of the sheddable loads have already been shed.

In some embodiments the balancing of the power budget takes into consideration the operating points already specified in a preceding iteration for components connected to the applicable bus and labelled as fixed. The balancing of the power budget also takes into consideration a total power demand of the consumers connected to the applicable bus, as a result of which the sum of the amounts of power provided by the generators connected to the selected bus does not exceed the total power demand.

While exemplary embodiments, application options and exemplary applications have been described in detail in particular with reference to the figures, it should be pointed out that a multiplicity of modifications are possible. It should additionally be pointed out that the exemplary versions and applications are merely examples that are not intended to restrict the scope of protection, the application and the design in any way. Rather, the above description provides a person skilled in the art with guidance for the implementation and/or application of at least one exemplary embodiment, wherein various modifications, in particular alternative or additional features and/or modifications of the function and/or arrangements of the components described, may be made as desired by a person skilled in the art without departing from the subject matter specified in each of the appended claims or from the legal equivalents of the subject matter and/or from the scope of protection thereof.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or an throughout this application does not exclude a plurality, and "comprising" does not exclude other steps or elements. The mention of a "unit" or a "module" does not preclude the use of more than one unit or module.

The invention claimed is:

1. A computer-implemented method for controlling an energy system comprising multiple components connected to one another by a multiplicity of buses of the energy system for energy transmission purposes, the components comprising generators and consumers, wherein the components are labelled as either non-fixed or fixed, depending on whether an energy operating point is specified, the method comprising:
    performing an iteration process via all of the buses of the multiplicity of buses, wherein an iteration for a bus selected from all of the buses comprises:
        specifying the energy operating points of components connected to the bus that are labelled as non-fixed, as an attempt to balance a power budget of the bus;
        if the power budget of the bus is balanced as a function of the specifying, labelling all of the components connected to the bus as fixed, and
        if the power budget of the bus is not balanced as a function of the specifying, converting the label of at least one component connected to the bus from fixed to non-fixed, and triggering a fresh iteration for the bus.

2. The method as claimed in claim 1, further comprising:
    triggering a fresh iteration via one or more buses that are connected to the bus via a component whose label is converted from fixed to non-fixed.

3. The method as claimed in claim 1, further comprising:
    allocating bus priorities to the buses and performing an iteration process via all of the buses in an order in accordance with the bus priorities,
    if the power budget is not balanced for a selected bus only the label for those components that are connected to the selected bus only or to the selected bus and a bus comprising higher bus priority is converted from fixed to non-fixed, and triggering a fresh iteration via one or more buses that have a higher priority than the selected bus and that are connected to the selected bus via a component that is labelled as non-fixed.

4. The method as claimed in claim 1, wherein one or more of the consumers are power shedding loads and wherein, during the balancing of the power budget of the bus, provided that excess power is available, a total power demand of the bus is increased by such a power shedding load connected to the bus.

5. The method as claimed in claim 1, wherein after all of the components are labelled as fixed, the method further comprises:
    performing power optimization by one or more measures, the power optimization involving at least some of the previously specified operating points being adapted.

6. The method as claimed in claim 5, wherein the one or more measures comprise at least one from storing excess power on one bus of the multiplicity of buses in energy stores, exchanging the excess power between buses of the multiplicity of buses, and delivering the excess power via an external grid connection of the energy system.

7. The method as claimed in claim 6, wherein one or more of the generators are resource-dependent generators and wherein the excess power for a bus connected to a resource-dependent generator is increased if a predetermined criterion with regard to a resource is met for the resource-dependent generator.

8. The method as claimed in claim 5, wherein the one or more measures comprise energy exchange control for an external grid connection of the energy system; and wherein the energy exchange control comprises at least one from internal load balancing, where remaining excess powers are stored in a store in the energy system, and external load balancing, where remaining excess powers are routed to generators having feedback capability with external resources and/or to at least one grid connection.

9. The method as claimed in claim 1, wherein one or more of the generators are energy stores that each have a fill level and/or a priority, and wherein during the balancing of the power budget of the respective bus it is determined for at least one such energy store connected to the respective bus, based on the fill level and/or priority of the energy store, whether a specific amount of power is provided thereby or fed back thereto.

10. The method as claimed in claim 1, wherein one or more of the generators are hybrid generators connected to at least two buses of the multiplicity of buses,
    the amount of power provided on one of the respective at least two buses by a hybrid generator of this kind corresponding to an additionally provided amount of power on one other of the respective at least two buses or to a power demand on the other of the respective at least two buses.

11. The method as claimed in claim 1, wherein the method for each bus of the multiplicity of buses further comprises:
    allocating component priorities to the components of the respective bus and specifying the energy operating points, when attempting to balance the power budget, in an order in accordance with the component priorities.

12. The method as claimed in claim 1, wherein the performance of an iteration process is continued up to a termination criterion, and wherein the termination criterion comprises one or more of the following elements: all of the components are labelled as fixed; the attempt at balancing fails for at least one bus.

13. The method as claimed in claim 1, wherein one or more of the consumers are sheddable loads, the method additionally comprising:
    if the power budget is not balanced for the bus, shedding one or more sheddable loads, labelling all of the components as non-fixed, and re-initializing the performance of an iteration process via all of the buses.

14. A computer program logic unit configured to carry out the method as claimed in claim 1.

15. An apparatus for controlling an energy system comprising multiple components connected to one another by a multiplicity of buses of the energy system for energy transmission purposes, the components comprising generators and consumers, wherein the components are labelled as either non-fixed or fixed, depending on whether an energy operating point is specified,
    wherein the apparatus comprises a computer program logic unit or a control device that is configured to carry out a control method comprising:
        performing an iteration process via all of the buses of the multiplicity of buses, wherein an iteration for a bus selected from all of the buses comprises:
            specifying the energy operating points of components connected to the bus that are labelled as non-fixed, as an attempt to balance a power budget of the bus;
            if the power budget of the bus is balanced as a function of the specifying, labelling all of the components connected to the bus as fixed, and
    if the power budget of the bus is not balanced as a function of the specifying, converting the label of at least one component connected to the bus from fixed to non-fixed, and triggering a fresh iteration for the bus
    and wherein the apparatus is additionally configured to take this as a basis for generating a control signal and for controlling the energy system using the control signal.

* * * * *